US011886299B2

(12) United States Patent
Cadwallader et al.

(10) Patent No.: US 11,886,299 B2
(45) Date of Patent: Jan. 30, 2024

(54) TECHNIQUES FOR PROVIDING INCREMENTAL BACKUP PROGRESS INDICATIONS

(71) Applicant: Apple Inc., Cupertino, CA (US)

(72) Inventors: Robert M. Cadwallader, San Francisco, CA (US); Christopher A. Wolf, Bahama, NC (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/645,429

(22) Filed: Dec. 21, 2021

(65) Prior Publication Data
US 2022/0391289 A1 Dec. 8, 2022

Related U.S. Application Data

(60) Provisional application No. 63/197,467, filed on Jun. 6, 2021.

(51) Int. Cl.
*G06F 12/00* (2006.01)
*G06F 11/14* (2006.01)
*G06F 11/30* (2006.01)
*G06F 3/06* (2006.01)

(52) U.S. Cl.
CPC .......... *G06F 11/1458* (2013.01); *G06F 3/065* (2013.01); *G06F 11/1451* (2013.01); *G06F 11/3075* (2013.01)

(58) Field of Classification Search
CPC ............ G06F 11/1458; G06F 11/1451; G06F 11/3075; G06F 3/065; G06F 3/067; G06F 3/0683
See application file for complete search history.

(56) References Cited

U.S. PATENT DOCUMENTS

| | | | |
|---|---|---|---|
| 7,765,187 B2 * | 7/2010 | Bergant | H04L 67/1095 707/614 |
| 9,110,964 B1 * | 8/2015 | Shilane | G06F 16/178 |
| 9,600,376 B1 * | 3/2017 | Krinke, II | G06F 11/1464 |
| 2019/0034217 A1 * | 1/2019 | Aravot | G06F 3/067 |

* cited by examiner

*Primary Examiner* — Shawn X Gu
(74) *Attorney, Agent, or Firm* — DICKINSON WRIGHT RLLP

(57) ABSTRACT

The described embodiments set forth techniques for providing a backup progress estimate for a backup of a source file system volume (FSV). The techniques involve determining, for the source FSV, a backup size during performance of backup operations. The operations can include determining the backup size based on a number of files on the source FSV. Additionally, the operations can include copying files of the source FSV and/or propagating corresponding files of a destination FSV to a location of the backup of the source FSV on a destination storage device and updating one or more metrics using a number of files and/or a number of bytes copied and/or propagated to the backup. In this manner, a progress indication for the backup may be determined based on the one or more metrics responsive to files and/or directories of the source file system volume being stored on a destination storage device.

20 Claims, 11 Drawing Sheets

250: (1) Determining, while backing up source files "C", "D", and "E" from a source storage device to a destination storage device, whether to copy or propagate source files "C", "D", and "E".

280: Copying the data of the source file "A" from the source storage device "Main_1" to the destination storage device "Main_2" to establish a destination file "A" at the destination storage device.

(2) Propagating/Copying each of the source files "C", "D", and "E" from the source storage device to the destination storage device to establish the destination files "C", "D", and "E".

(3) Populating respective (i) block map information, and (ii) timestamp information of the source files "C", "D", and "E" into respective metadata of the destination files "C", "D", and "E".

230: Propagating, within the destination storage device, a destination file "B" to the location of the backup of the source storage device on the destination storage device.

250: (1) Determining, while backing up source files "C", "D", and "E" from a source storage device to a destination storage device, whether to copy or propagate source files "C", "D", and "E".

(2) Propagating/Copying each of the source files "C", "D", and "E" from the source storage device to the destination storage device to establish the destination files "C", "D", and "E".

(3) Populating respective (i) block map information, and (ii) timestamp information of the source files "C", "D", and "E" into respective metadata of the destination files "C", "D", and "E".

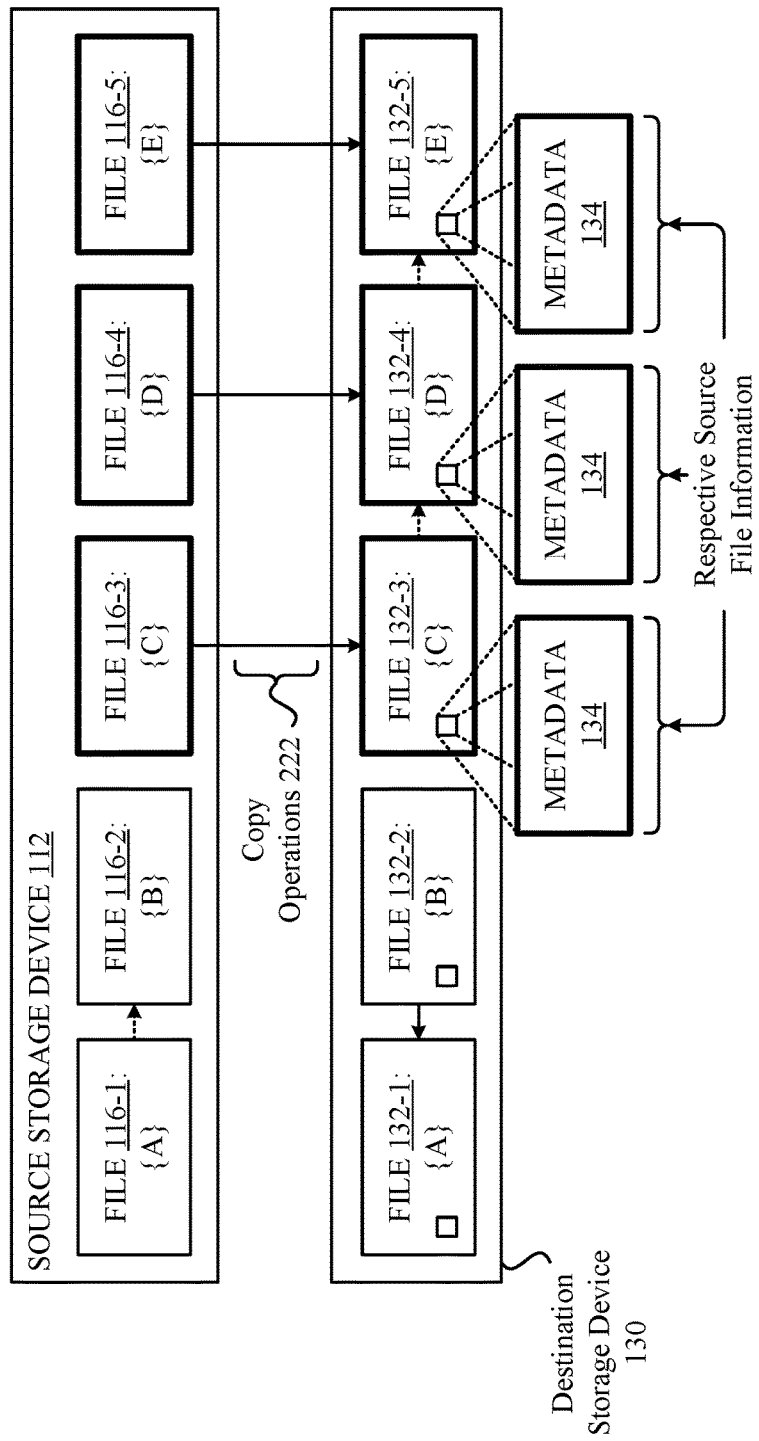

*FIG. 2E*

260: (1) Identifying a condition in which the source files "A", "B", "C", "D", and "E" become unavailable at the source storage device.

(2) Initializing a restoration procedure to restore the destination files "A", "B", "C", "D", and "E" from the destination storage device to the source storage device.

270: (1) Establishing, using (i) the destination files "A" and "B", and (ii) the respective metadata, restored source files "A" and "B".

(2) Establishing, using (i) the destination files "C", "D", and "E", and (ii) the respective metadata, restored source files "C", "D", and "E".

280: Copying the data of the source file "A" from the source storage device "Main_1" to the destination storage device "Main_2" to establish a destination file "A" at the destination storage device.

300

310 — DETERMINING, FOR A SOURCE FSV, A TOTAL BACKUP SIZE VALUE BASED ON, AT LEAST, A TOTAL NUMBER OF FILES AND A TOTAL NUMBER OF BYTES OF DATA OF THE SOURCE FSV

320 — IN RESPONSE TO DETERMINING THAT A DESTINATION FSV, ON A DESTINATION STORAGE DEVICE CORRESPONDING TO THE SOURCE FSV INCLUDES A DESTINATION NODE CORRESPONDING TO THE SOURCE NODE: PROPAGATING THE DESTINATION NODE; AND UPDATING, IN RESPONSE TO A DETERMINATION THAT METADATA OF THE DESTINATION NODE INDICATES THAT THE DESTINATION NODE AND THE SOURCE NODE ARE THE SAME, AT LEAST ONE COMPLETION METRIC

330 — IN RESPONSE TO DETERMINING THAT THE DESTINATION FSV DOES NOT INCLUDE A DESTINATION NODE CORRESPONDING TO THE SOURCE NODE: COPYING THE SOURCE NODE TO THE LOCATION CORRESPONDING TO THE BACKUP OF THE SOURCE FSV ON THE DESTINATION STORAGE DEVICE; UPDATING METADATA ASSOCIATED WITH THE SOURCE NODE; AND UPDATING THE AT LEAST ONE COMPLETION METRIC

340 — PROVIDING A BACKUP COMPLETION PERCENTAGE THAT IS BASED ON THE AT LEAST ONE COMPLETION METRIC AND THE TOTAL BACKUP SIZE VALUE

*FIG. 3*

TECHNIQUES FOR PROVIDING INCREMENTAL BACKUP PROGRESS INDICATIONS

CROSS-REFERENCE TO RELATED APPLICATIONS

The present application claims the benefit of U.S. Provisional Application No. 63/197,467, entitled "TECHNIQUES FOR PROVIDING INCREMENTAL BACKUP PROGRESS INDICATIONS," filed Jun. 6, 2021, the content of which is incorporated herein by reference in its entirety for all purposes.

FIELD

The described embodiments generally relate to performing incremental backups. More particularly, the described embodiments involve providing a backup progress indication during performance of an incremental backup of a source file system volume using metadata associated with files and/or directories of the source file system volume.

BACKGROUND

Computing devices have become the primary means through which users manage their personal/work-related data (e.g., digital media items, documents, emails, and the like). In this regard, it can be important for users to regularly backup their data so that recovery procedures can be carried out in an organized manner when necessary (e.g., when a data loss or corruption occurs). A popular approach for a given computing device to carry out a data backup procedure involves utilizing a mass storage device (e.g., a network-based storage drive) that is accessible to the computing device. In particular, the computing device can provide a copy of its data (e.g., stored on a local storage device) to the mass storage device, which can then be used at a later time as a basis to carry out a recovery procedure when necessary. Notably, the mass storage device may typically have a storage capacity that is substantially larger than the local storage device of the computing device. This can beneficially enable chronological versions of the data to be established, thereby increasing the granularity by which recovery procedures can be executed.

Despite the foregoing benefits that can be afforded using mass storage devices to carry out data backups, several performance issues continue to persist that have yet to be properly addressed. For example, when a computing device is carrying out an incremental data backup procedure, a progress indication (e.g., expressed as a percentage of the total backup that has been completed) may be presented to the user of the computing device. Traditionally, incremental backup progress is calculated by measuring the size of files and directories that have changed since the previous backup (e.g., in what may be referred to as the "sizing phase" of the incremental backup). The sizing phase typically involves an iteration of the source file system volume to determine a total size of the incremental backup. Once copying has initiated, sizes of files and directories copied are accumulated and compared to a total-to-be-copied value determined in the sizing phase. The backup progress indication provided to the user may increase as the sizes of the files and directories copied accumulate toward the total-to-be-copied value. However, iterating through the source file system volume, prior to copying data as part of the backup, may be relatively time consuming—and, during the sizing phase, the backup progress indication may not change (e.g., may not increase) or may not be provided to the user. In some instances, this may appear to the user as though progress has stalled or that an error occurred during the backup.

Consequently, there exists a need for a more efficient approach for providing backup progress indication to the user while performing incremental data backups from a computing device to a mass storage device.

SUMMARY

The described embodiments set forth techniques for providing a backup progress indication during performance of a backup at a computing device.

According to some embodiments, a method is disclosed for providing an improved backup progress estimate for a backup of a source file system volume (FSV) associated with a source computing device. The method may include, at the source computing device, (1) determining, for the source FSV, a total backup size indicator based on at least a total number of files and a total number of bytes of data of the source FSV. The method may also include (2) for each source node of a plurality of source nodes of the source FSV, in response to determining that a destination FSV, on a destination storage device, corresponding to the source FSV includes a destination node corresponding to the source node: (i) propagating the destination node by at least one of moving the destination node to a location corresponding to the backup of the source FSV on the destination storage device and associating a hard link corresponding to the destination FSV with the backup of the source FSV on the destination storage device, and (ii) updating, in response to a determination that metadata of the destination node indicates that the destination node and the source node are the same, at least one completion metric. The method also includes, (3) for each source node of a plurality of source nodes of the source FSV, in response to determining that the destination FSV does not include a destination node corresponding to the source node, (i) copying the source node to the location corresponding to the backup of the source FSV on the destination storage device, (ii) updating metadata associated with the source node, and (iii) updating the at least one completion metric. The method may also include (4) providing a backup completion percentage that is based on the at least one completion metric.

Other embodiments include a non-transitory computer readable storage medium configured to store instructions that, when executed by a processor included in a computing device, cause the computing device to carry out the various steps of any of the foregoing methods. Further embodiments include a computing device that is configured to carry out the various steps of any of the foregoing methods.

Other aspects and advantages of the invention will become apparent from the following detailed description taken in conjunction with the accompanying drawings that illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements.

FIGS. 2A-2H illustrate conceptual diagrams of an example scenario in which a file system manager performs backup and restore procedures between a source storage device and a destination storage device, according to some embodiments.

FIG. 3 is a flow diagram illustrating a method for providing an improved backup progress estimate for a backup of a source FSV, according to some embodiments.

DETAILED DESCRIPTION

Figure 1:
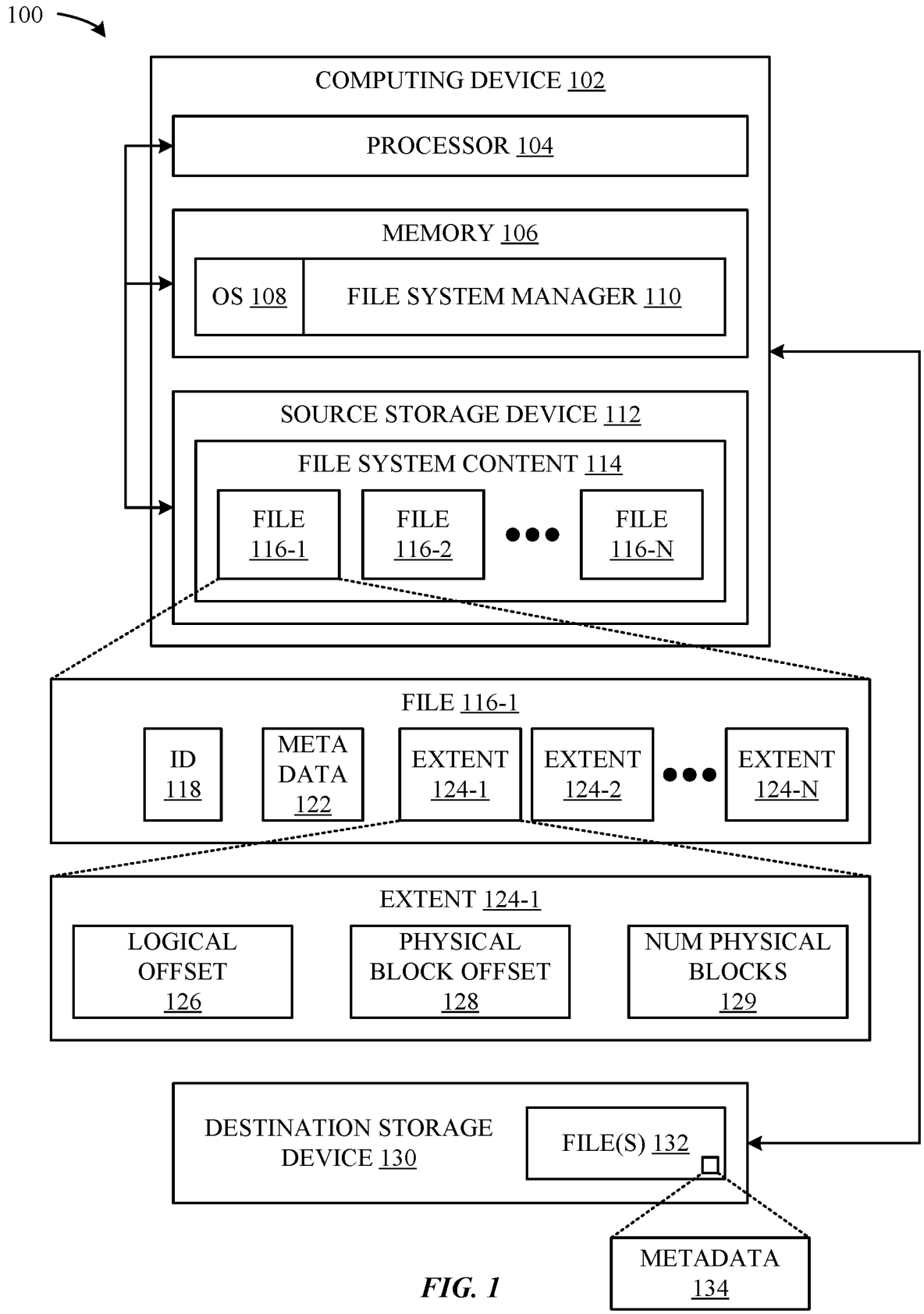
FIG. 1 illustrates a system diagram of a computing device that can be configured to perform the various techniques described herein, according to some embodiments.

Representative applications of apparatuses and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

The described embodiments are directed to performing incremental backups. More particularly, the described embodiments involve providing a backup progress indication during performance of an incremental backup of a source file system volume using metadata associated with files and/or directories of the source file system volume.

According to some embodiments, a technique is disclosed for providing an improved progress indication for file system backups. The technique may allow an incremental backup system to provide detailed progress (e.g., indicating bytes copied, percent complete, and the like) when copying files and directories (e.g., during performance of a new backup or during performance of an incremental backup, without performing sizing phase operations). In some embodiments, each directory in a backup may be annotated with metadata to indicate information corresponding to a completion date (e.g., corresponding to a previous backup date of a directory), a physical size, a logical size, a recursive count, other suitable information, or a combination thereof. The metadata for a respective directory may be updated when a backup of the directory is complete. During performance of a subsequent backup, the sizing information of the metadata may be used to calculate progress toward a completion of the subsequent backup.

In some embodiments, the improved progress indication technique may bypass the sizing phase associated with performance of traditional backup techniques. In particular, the technique can involve accumulating sizes of files and/or directories copied during performance of a backup toward a total value that represents the entire contents of a file system volume associated with the backup. The total value may be derived in constant time from a file system application programming interface (API). As files and/or directories are copied to the new backup, sizing information associated with the files and/or directories is added to a total complete value. A percent complete value indicating a progress of the backup may then be determined by dividing the total complete value by the total value.

In some embodiments, as files and/or directories that have not changed since a previous backup are encountered during a copying phase of a new backup, existing versions of the files and/or directories stored in the previous backup are propagated into the new backup, e.g., by moving the previously backed up version to the new back up or by creating a hard link in the new back up to the previously backed up version.

In some embodiments, sizing information associated with files and/or directories propagated into the new backup is accounted for in the backup progress by subtracting the sizing information from the total source file system volume (FSV) size. Progress of the backup may converge toward 100% (e.g., complete) as sizing information associated with files and/or directories copied to the new backup is added to the total complete value and sizing information associated with propagated files and/or directors is subtracted from the total value (e.g., which may reduce the total value and increase the percent complete value).

In some embodiments, if the user associated with the backup excludes content on the source FSV from a backup, sizing information associated with excluded content is determined in parallel with copying operations of the backup (e.g., during the copy phase of the backup). The sizing information associated with the excluded content may be periodically removed from the total value (e.g., of the backup).

In some embodiments, the systems and methods described herein may be configured to provide an improved backup progress estimate for a backup of an FSV associated with a source computing device. The systems and methods described herein may be configured to determine, for the source FSV, a total backup size indicator based on at least a total number of files and a total number of bytes of data of the source FSV. The source FSV may include any suitable volume stored on the file system of the source computing device. The systems and methods described herein may be configured to synthesize the total number of files and/or the total number of bytes for the source FSV into the total backup size indicator. For example, the total backup size indicator may include one or more components that comprise the total backup size indicator. The one or more components may include a value corresponding to the total number of files of the source FSV, a value corresponding to the total number of bytes of data of the source FSV, and/or other suitable components.

In some embodiments, the systems and methods described herein may be configured to identify a total number of files and/or a total number of bytes associated with the data stored on the source FSV using a system API or other suitable technique for determining a total number of files and/or a total number of bytes associated with the data stored on the source FSV. Additionally, or alternatively, the systems and methods described herein may be configured to identify at least one snapshot, using any suitable technique, of the source FSV. The total number of files and the total number of bytes of the source FSV may correspond to the snapshot of the source FSV. In some embodiments, the systems and methods described herein may be configured to exclude, from the total number of files of the source FSV, files having a file type indicating exclusion from the snapshot of the source FSV or a location indicating exclusion from the snapshot of the source FSV. For example, one or more files of the snapshot may be excluded from backup (e.g., by the user, by an operating system of the source computing device, by an application of the source computing device, and the like) and/or various memory locations of the source FSV may be excluded from the backup. Additionally, or alternatively, metadata associated with each file of the total number of files of the source FSV may indicate that a corresponding file is excluded from the backup of the source FSV. The systems and methods described herein may be configured to update the total backup size indicator by subtracting files (e.g., and a number of bytes corresponding to the files) excluded from the snapshot of the source FSV.

In some embodiments, the systems and methods described herein may be configured to identify nodes associated with the source FSV targeted for backup. A node may include a file or a directory stored on the source FSV. The source FSV may include a plurality of nodes, and each node may correspond to a tree of nodes. For example, a parent node, such as a directory, may include one or more child nodes, such as a subdirectory and/or file. Nodes on the source FSV may be referred to herein as source nodes. In some embodiments, the systems and methods described herein may be configured to use metadata associated with each node of the source FSV to determine the total backup size indicator. For example, the metadata associated with a respective node may include sizing information for the respective node, relationship information for the respective node (e.g., indicating a parent node relationship and/or one or more child node relationships, including distant descendant nodes), sizing information for each child node of the respective node, a creation date of the respective node, a modification date of the respective node, other suitable information, or a combination thereof. The systems and methods described herein may generate the metadata for the source nodes by recursively scanning each node of the source FSV (e.g., at least during performance of an initial backup). During performance of a subsequent or incremental backup, the systems and methods described herein may be configured to use the metadata for each source node to determine the total number of files and/or the total number of bytes for the source FSV.

In some embodiments, the systems and methods described herein may be configured to identify a destination FSV (e.g., a volume on a destination storage device proximate the source computing device or remotely located from the source computing device corresponding to a destination of backup of the source FSV). The destination FSV may include one or more previous backups of the source FSV comprising a plurality of nodes (e.g., which may be referred to herein as destination nodes) or the destination FSV may include no previous backups of the source FSV. The systems and methods described herein may be configured to, for each source node, determine whether the destination FSV includes a destination node that corresponds to (e.g., is the same as) a respective source node. The systems and methods described herein may use metadata associated with the destination node to determine whether the destination node is the same as the respective source node.

In response to determining that a destination FSV includes a destination node that corresponds to the source node, the systems and methods described herein may be configured to propagate the destination node to the backup of the source FSV on the destination storage device. For example, the systems and methods described herein may be configured to move the destination node to the backup of the source FSV on the destination storage device. Additionally, or alternatively, the systems and methods described herein may be configured to generate a hard link pointing to the location of the destination node on the destination FSV. The systems and methods described herein may be configured to store the hard link in the backup of the source FSV on the destination storage device. The systems and methods described herein may be configured to propagate destination nodes using any suitable technique in addition to or other than those described herein, such as techniques using soft links, techniques using clone operations, other suitable techniques, or a combination thereof. The systems and methods described herein may be configured to update one or more completion metrics associated with the backup progress of the backup of the source FSV.

In some embodiments, the systems and methods described herein may be configured to, in response to determining that the destination FSV does not include a destination node that corresponds to a respective source node, copy the source node to the location corresponding to the backup of the source FSV on the destination storage device. The systems and methods described herein may be configured to update metadata associated with the source node. The metadata may include sizing information associated with the source node, a completion date (indicating a date corresponding to copying the source node to the backup of the source FSV on the destination storage device), and/or other suitable information. The metadata may be stored and/or updated on a corresponding source node, on a corresponding destination node, or on both of the corresponding source node and the corresponding destination node. The systems and methods described herein may be configured to update the one or more completion metrics in response to copying the respective source node to the backup or the source FSV.

In some embodiments, the one or more completion metrics may include a total number of files complete metric, a total number of bytes complete metric, a total number of source nodes of a predetermined source nodes list complete metric, any other suitable metric, or a combination thereof. The total number of files complete metric may include a total number of files associated with each propagated destination node and/or each copied source node divided by the total number of files corresponding to the total backup size indicator (e.g., indicating a ratio of files complete over the total number of files corresponding to the total backup size indicator). Alternatively, the total number of files complete metric may include the total number of files associated with each propagated destination node and each copied source node (e.g., indicating the total number of files complete).

The total number of bytes complete metric may include a total number of bytes associated with each propagated destination node and each copied source node divided by the total number of bytes corresponding to the total backup size indicator (e.g., indicating a ratio of bytes complete over the total number of bytes corresponding to the total backup size indicator). Alternatively, the total number of bytes complete metric may include the total number of bytes associated with each propagated destination node and each copied source node (e.g., indicating the total number of bytes complete).

The total number of source nodes of a predetermined source nodes list complete metric may include a total number of completed source nodes of a source nodes list divided by a total number of source nodes on the source nodes list (e.g., indicating a ratio of the total number of source nodes of the source nodes list complete over the total number of source nodes on the source nodes list). Alternatively, the total number of source nodes of a predetermined source nodes list complete metric may include a total number of completed source nodes of a source nodes list (e.g., indicating the total source nodes complete of the source nodes list). To generate the source nodes list, the systems and methods described herein may be configured to sort the source nodes of the source FSV by node size (e.g., in descending order). Additionally, or alternatively, the systems and methods described herein may be configured to sort the source nodes by number of file system events (e.g., for each source node) having occurred since a previously performed backup of the source FSV. The systems and methods described herein may sort the source nodes by the number of file system events in descending order or any suitable order. The systems and methods described herein may be configured to identify a predetermined number of source nodes of the sorted source nodes. For example, the predetermined number of source nodes may include five source nodes, ten source nodes, one hundred source nodes, or any suitable number of source nodes. The predetermined number of source nodes may correspond to the most active source nodes (e.g., by node size, by the greatest number of file system events, etc.) of the source FSV. The systems and methods described herein may be configured to generate the source nodes list using the predetermined number of source nodes (e.g., where the source nodes list comprises the most active source nodes of the source FSV). As source nodes of the source nodes list are either propagated or copied to the backup of the source FSV on the destination storage device, the systems and methods described herein may update the total number of source nodes of a predetermined source nodes list complete metric.

In some embodiments, the systems and methods described herein may be configured to identify source nodes having a node type indicating exclusion from the backup of the source FSV. For example, during the copy phase of the backup of the source FSV, the systems and methods described herein may be configured to determine, based on metadata associated with a respective source node or other suitable information associated with the respective source node, whether the respective source node includes a source node type (e.g., indicated by the metadata or other information) indicating that the respective source node is excluded from the backup of the source FSV. In response to determining that a respective source node includes a node type indicating exclusion of the respective source node from the backup of the source FSV, the systems and methods described herein may be configured to update the total backup size indicator by subtracting a number of files and/or a number of bytes associated with respective source node (e.g., which may decrease the total backup size indicator)

In some embodiments, the systems and methods described herein may be configured to generate a backup completion percentage based on the one or more completion metrics. For example, the systems and methods described herein may synthesize the one or more completion metrics to generate the backup completion percentage. For example, the systems and methods described herein may be configured to set the backup completion percentage to a result of dividing a sum of the one or more completion metrics by the total number of completion metrics. The systems and methods described herein may be configured to update the backup completion percentage in response to subsequent copying of source nodes/subsequent propagations, and/or subsequent exclusions. The systems and methods described herein may be configured to provide, to the user at a display, a backup completion percentage.

A more detailed discussion of these techniques is set forth below and described in conjunction with FIGS. 1-4, which illustrate detailed diagrams of systems and methods that can be used to implement these techniques.

FIG. 1 illustrates a block diagram 100 of different components of a computing device 102 that can be configured to implement the various techniques described herein, according to some embodiments. More specifically, FIG. 1 illustrates a high-level overview of the computing device 102, which, as shown, can include at least one processor 104, at least one memory 106, and at least one source storage device 112. According to some embodiments, the processor 104 can be configured to work in conjunction with the memory 106 and the source storage device 112 to enable the computing device 102 to implement the various techniques set forth in this disclosure. According to some embodiments, the source storage device 112 can represent a storage device that is accessible to the computing device 102, e.g., a hard disk drive, a solid-state drive, and hybrid device (e.g., including both hard disk and solid-state drives), and the like.

As shown in FIG. 1, the source storage device 112 can be configured to store file system content 114 of a file system volume that can be mounted at the computing device 102. For example, the processor 104 can be configured to mount a file system volume that includes an OS 108 that is compatible with the computing device 102. According to some embodiments, the OS 108 can enable a file system manager 110 to execute on the computing device 102, where the file system manager 110 can be involved in the backup progress determination techniques described herein. As is well-understood, the OS 108 can also enable a variety of processes to execute on the computing device 102, e.g., OS daemons, native OS applications, user applications, and the like. According to some embodiments, the file system volume can also include user data that is accessible at the computing device 102 by way of the OS 108. However, it is noted that, in some configurations, such user data can instead be stored in a separate file system volume that can be concurrently mounted on the computing device 102 and accessible to the OS 108. According to some embodiments, the file system volumes can be members of a same (or different) logical container and can be configured to utilize the same physical storage space within the source storage device 112. This beneficially provides enhanced flexibility as each file system volume can consume space within the source storage device 112 on an as-needed basis. In addition, each file system volume can be configured to enforce particular configurations (e.g., permissions, ownerships, encryption schemes, fragmentation schemes, etc.) that are independent from the configurations of other file system volumes managed by the computing device 102.

As shown in FIG. 1, the file system content 114 can include a collection of files 116, and each file 116 can include an identifier 118 that can be used to uniquely identify the file 116 within the source storage device 112. Each file 116 can include metadata 122 that can be used to store various information that can be utilized by the file system manager 110 to perform the techniques described herein. For example, the metadata 122 may include a file size, a creation date, a modification date, relationship information (e.g., indicating parent and/or child relationships of the file 116), exclusion information (e.g., indicating the file 116 is excluded from backup), other information, or a combination thereof. Additionally, each file 116 can include one or more extents 124 that describe the layout of the file 116 within the source storage device 112. For example, each extent 124 can include a logical offset of the extent 124 relative to the other extents, which is illustrated in FIG. 1 as a logical offset 126. Additionally, each extent 124 can include a starting physical block address (within the source storage device 112), which is illustrated in FIG. 1 as the physical block offset 128. Additionally, each extent 124 can include a length of successive physical blocks (that follow the starting physical block address), which is illustrated in FIG. 1 as the number of physical blocks 129. In this manner, a single file 116 can be separated into various extents 124 that are stored across different areas of the source storage device 112.

Additionally, the computing device 102 can be configured to communicate with a destination storage device 130 to perform a variety of useful features, including backups of the files 116. In particular, the destination storage device 130 can receive files 116 from the computing device 102 and store the files 116 as files 132 within the destination storage device 130. In this manner, the destination storage device 130 can serve as a backup destination for the computing device 102, where the files 132 are stored in accordance with the various techniques set forth in this disclosure. In particular, the files 132 can include metadata 134 that can be used to store various information (e.g., timestamp information, block map information, completion data, file size, etc.) that can be utilized by the file system manager 110 to perform the techniques described herein. Additionally, it will be understood that the files 132 can include additional content not illustrated in FIG. 1, such as the content included in each of the files 116 (e.g., file ID, extents, etc.).

Accordingly, FIG. 1 sets forth an overview of different components/entities that can be included in the computing device 102 to enable the embodiments described herein to be properly implemented. For example, in some embodiments, the computing device 102 may be configured to provide an improved backup progress estimate for a backup of an FSV (e.g., which may be referred to herein as the source FSV) associated with the computing device 102.

In some embodiments, the computing device 102 may determine, for the source FSV, a total backup size indicator based on at least a total number of files and a total number of bytes of data of the source FSV. The computing device 102 may identify a total number of files and/or a total number of bytes associated with the data stored on the source FSV using a system API or other suitable technique for determining a total number of files and/or a total number of bytes associated with the data stored on the source FSV. Additionally, or alternatively, the computing device 102 may identify at least one snapshot of the source FSV, using any suitable technique. The total number of files and the total number of bytes of the source FSV may correspond to the snapshot of the source FSV.

The computing device 102 may exclude, from the total number of files of the source FSV, files having a file type and/or metadata indicating exclusion from the snapshot of the source FSV or a location indicating exclusion from the snapshot of the source FSV, as described. The computing device 102 may update total backup size indicator by subtracting files (e.g., and a number of bytes corresponding to the files) excluded from the snapshot of the source FSV. The computing device 102 may generate the total backup size indicator such that the total backup size indicator includes a first component corresponding to the total number of files and a second component corresponding to the total number of bytes for the source FSV.

In some embodiments, the computing device 102 may identify nodes associated with the source FSV targeted for backup. A node may include a file, such as the file 116, or a directory stored on the source FSV. The source FSV may include a plurality of nodes and each node may correspond to a tree of nodes. For example, a parent node, such as a directory, may include one or more child nodes (e.g., including distant descendant nodes), such as a subdirectory and/or file. Nodes on the source FSV may be referred to herein as source nodes. The computing device 102 may use the metadata 122 to determine the total backup size indicator. For example, the metadata 122 may include sizing information for the respective node (e.g., such as the file 116). The computing device 102 may add the size of each source node indicated by corresponding metadata to determine the total number of files and/or the total number of bytes for the source FSV.

In some embodiments, the computing device 102 may identify a destination FSV on the destination storage device 130 corresponding to the source FSV. The destination FSV may include one or more previous backups of the source FSV comprising a plurality of nodes (e.g., which may be referred to herein as destination nodes) or the destination FSV may include no previous backups of the source FSV. The computing device 102, for a source node, determine whether the destination FSV includes a destination node (e.g., a file or directory stored on the destination storage device 130) that corresponds to (e.g., is the same as) the source node.

The computing device 102 may use the metadata 134 to determine whether the destination node is the same as the respective source node. For example, the metadata 134 may indicate a completion date of the destination node (e.g., a date that the destination node was copied to the destination storage device 130 as part of a previous backup of the source FSV). The computing device 102 may determine that the destination node is the same as the source node if a modification date (e.g., indicated by the metadata 122) of the source node predates the completion date of the destination node. It should be understood that the computing device 130 may determine whether the destination node is the same as the source node using any suitable information or technique.

In response to determining that the destination node is the same as the source node, the computing device 102 may propagate the destination node to the backup of the source FSV on the destination storage device 130. For example, the computing device 102 to move the destination node to the backup of the source FSV on the destination storage device 130 (e.g., instead of copying the source node from the source FSV to the destination storage device 130). Additionally, or alternatively, the computing device 102 may generate a hard link pointing to the location of the destination node on the destination FSV stored on the destination storage device 130. The computing device 102 may store the hard link in the backup of the source FSV on the destination storage device 130. Additionally, or alternatively, the computing device 102 may be configured to propagate destination nodes using any suitable technique in addition to or other than those described herein, such as techniques using soft links, techniques using clone operations, other suitable techniques, or a combination thereof.

In some embodiments, if the computing device 102 determines that the destination FSV does not include a destination node corresponding to the source node, the computing device 102 may copy the source node to the location corresponding to the backup of the source FSV on the destination storage device 130. The computing device 102 may update the metadata 134 associated with the copy of the source node stored in the backup of the source FSV on the destination storage device 130.

In some embodiments, the computing device 102 may update one or more completion metrics associated with the backup progress of the backup of the source FSV in response to one or more destination nodes being propagated and/or one or more source nodes being copied to the backup of the source FSV on the destination storage device 130. The one or more completion metrics may include a total number of files complete metric, a total number of bytes complete metric, a total number of source nodes of a predetermined source nodes list complete metric, any other suitable metric, or a combination thereof. The total number of files complete metric may include a total number of files associated with each propagated destination node and/or each copied source node divided by the total number of files corresponding to the total backup size indicator (e.g., indicating a ratio of files complete over the total number of files corresponding to the total backup size indicator). Alternatively, the total number of files complete metric may include the total number of files associated with each propagated destination node and each copied source node (e.g., indicating the total number of files complete).

The total number of bytes complete metric may include a total number of bytes associated with each propagated destination node and each copied source node divided by the total number of bytes corresponding to the total backup size indicator (e.g., indicating a ratio of bytes complete over the total number of bytes corresponding to the total backup size indicator). Alternatively, the total number of bytes complete metric may include the total number of bytes associated with each propagated destination node and each copied source node (e.g., indicating the total number of bytes complete).

The total number of source nodes of a predetermined source nodes list complete metric may include a total number of completed source nodes of a source nodes list divided by a total number of source nodes on the source nodes list (e.g., indicating a ratio of the total number of source nodes of the source nodes list complete over the total number of source nodes on the source nodes list). Alternatively, the total number of source nodes of a predetermined source nodes list complete metric may include a total number of completed source nodes of a source nodes list (e.g., indicating the total source nodes complete of the source nodes list). To generate the source nodes list, the computing device 102 may sort the source nodes of the source FSV by node size (e.g., in descending order). Additionally, or alternatively, the computing device 102 may sort the source nodes by number of file system events (e.g., for each source node) having occurred since a previously performed backup of the source FSV. The computing device 102 may sort the source nodes by the number of file system events in descending order or any suitable order. The computing device 102 may identify a predetermined number of source nodes of the sorted source nodes. For example, the predetermined number of source nodes may include five source nodes, ten source nodes, one hundred source nodes, or any suitable number of source nodes. The predetermined number of source nodes may correspond to the most active source nodes (e.g., by node size and/or by number of file system events) of the source FSV. The computing device 102 may generate the source nodes list using the predetermined number of source nodes (e.g., where the source nodes list comprises the most active source nodes of the source FSV). As source nodes of the source nodes list are either propagated or copied to the backup of the source FSV on the destination storage device 130, computing device 102 may update the total number of source nodes of a predetermined source nodes list complete metric.

In some embodiments, the computing device 102 may identify source nodes having a node type indicating exclusion from the backup of the source FSV. For example, during the copy phase of the backup of the source FSV, the computing device 102 may determine, based on the metadata 122 corresponding to a receptive source node, whether the respective source node includes a source node type indicating that the respective source node is excluded from the backup of the source FSV. In response to determining that a respective source node includes a node type indicating exclusion of the respective source node from the backup of the source FSV, the computing device 102 may update the total backup size indicator by subtracting a number of files and/or a number of bytes associated with respective source node (e.g., which may decrease the total backup size indicator).

The computing device 102 may generate a backup completion percentage based on the one or more completion metrics. For example, the computing device 102 may synthesize the one or more completion metrics to generate the backup completion percentage. For example, the computing device 102 may generate the backup completion percentage by dividing a sum of the one or more completion metrics by the total number of completion metrics. For example, the total number of files complete metric may indicate 5% of the files of the backup are complete (e.g., determined by dividing a total number of files copied or propagated by the total number of files of the total backup size indicator), the total number of bytes complete metric may indicate that 50% of the bytes of the backup are complete (e.g., determined by dividing a total number of bytes corresponding to files copied or propagated by the total number of bytes of data of the total backup size indicator), and the total number of source nodes of a predetermined source nodes list complete metric may indicate that 70% of the nodes on the source node list are complete (e.g., determined by dividing a total number of nodes on the source nodes list that are copied or propagated by the total number of source nodes on the source nodes list). The computing device 102 may determine a sum of the one or more completion metrics (e.g., 5+50+ 70=125). The computing device 102 may then divide the sum of the one or more completion metrics by the total number of completion metrics (e.g., 125/3=41.7%) and set the backup completion percentage to the result (e.g., 41.7%). It should be understood that the values used herein are merely illustrative and that the one or more completion metrics may include any suitable values and/or any suitable number of metrics. In some embodiments, the computing device 102 may assign weights to each completion metric before determining the sum of the one or more completion metrics. Alternatively, weights may be predetermined for each of the one or more completion metrics. The computing device 102 may be configured to determine a median value of the weighted completion metrics. The computing device 102 may set the backup completion percentage to the median value.

The computing device 102 may update the backup completion percentage in response to subsequent copying of source nodes/subsequent propagations, and/or subsequent exclusions. The computing device 102 provide, to the user at a display, the backup completion percentage. The backup completion percentage may include a numerical percentage value that increases toward 100% as destination nodes are propagated, source nodes are copied, or excluded nodes are subtracted from the total backup size indicator. Additionally, or alternatively, the backup completion percentage may include a graphical representation (e.g., such as a status bar or other suitable graphical representation) that indicates the percent complete of the backup of the source FSV.

Figure 2A:
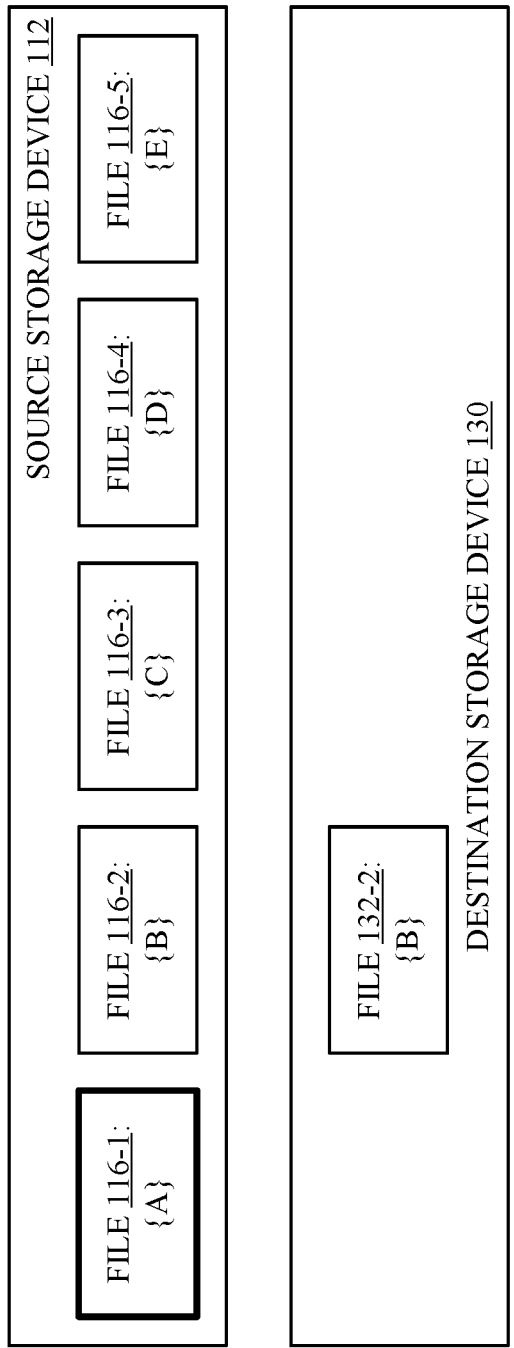

As previously described above, the computing device 102 may be configured to perform various backups of the source FSV to the destination storage device 130. FIGS. 2A-2H illustrate conceptual diagrams of an example scenario in which the file system manager 110 performs backup and restore operations between a source storage device (e.g., the source storage device 112) and a destination storage device (e.g., the destination storage device 130), according to some embodiments. As shown in FIG. 2A, a first step 210 can involve the file system manager 110 receiving a request to back up the source file 116 "A" from the source storage device 112 to the destination storage device 130. For example, the request can be issued in response to a periodic backup schedule being triggered, a manual backup being triggered, and so on. In the example scenario, the destination storage device 130 does not include a file corresponding to the source file 116 "A" (e.g., no backups have occurred whereby the source file 116 "A" or the current version of the source file 116 "A" was backed up to the destination storage device 130), as illustrated in FIG. 2A.

The file system manager 110 may recursively scan or search the destination storage device 130 to determine whether a file on the destination storage device 130 (e.g., destination nodes) corresponds to the source file 116 "A". In response to determining that the destination storage device 130 does not include a file that corresponds to the source file 116 "A", the file system manager 110 may initiate a copy operation to copy the source file 116 "A" to the destination storage device 130.

Figure 2B:
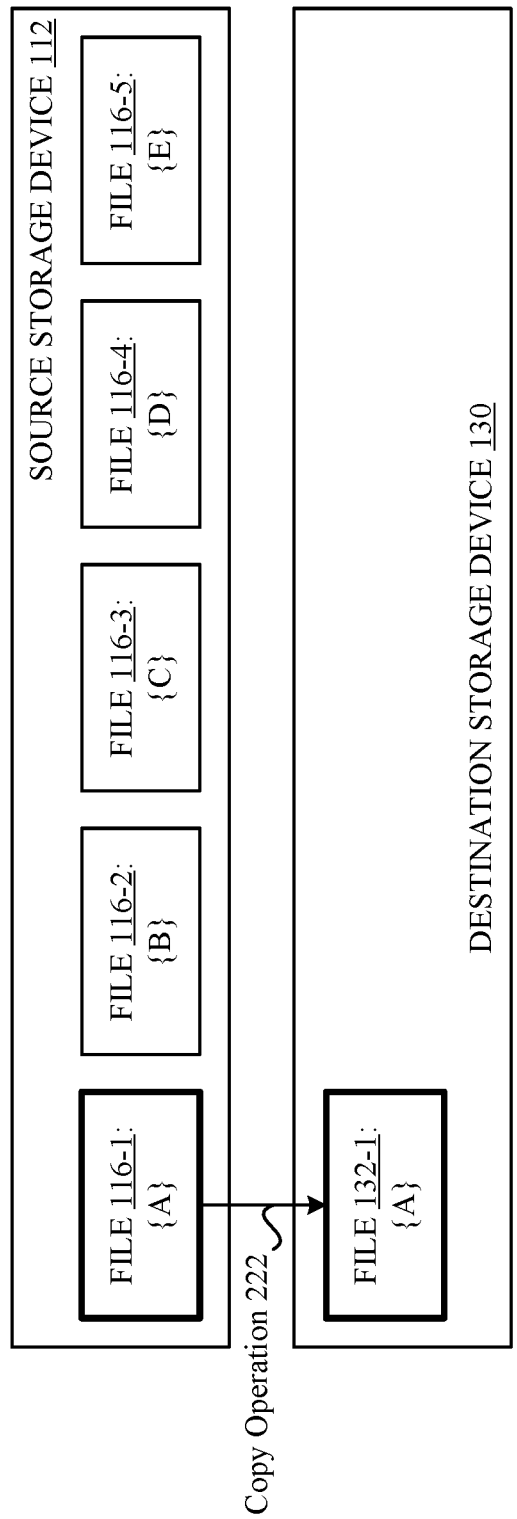

As shown in FIG. 2B, step 220 can involve the file system manager 110 creating, within the destination storage device 130, a destination file 132 "A" by copying, via a copy operation 222, the content of the source file 116 "A" from the source storage device 112 to the destination storage device 130. In this regard, the storage space consumed by the destination file 132 "A" within the destination storage device 130 matches the storage space consumed by the source file 116 "A" within the source storage device 112, as the destination file 132 "A" is a copy of the source file 116 "A". The file system manager 110 my update the one or more completion metrics in response to copying the source file 116 "A" to the destination storage device 130. For example, the file system manager 110 may update the one or more completion metrics based on metadata 122 associated with the source file 116 "A", as is described in greater detail herein.

Figure 2C:
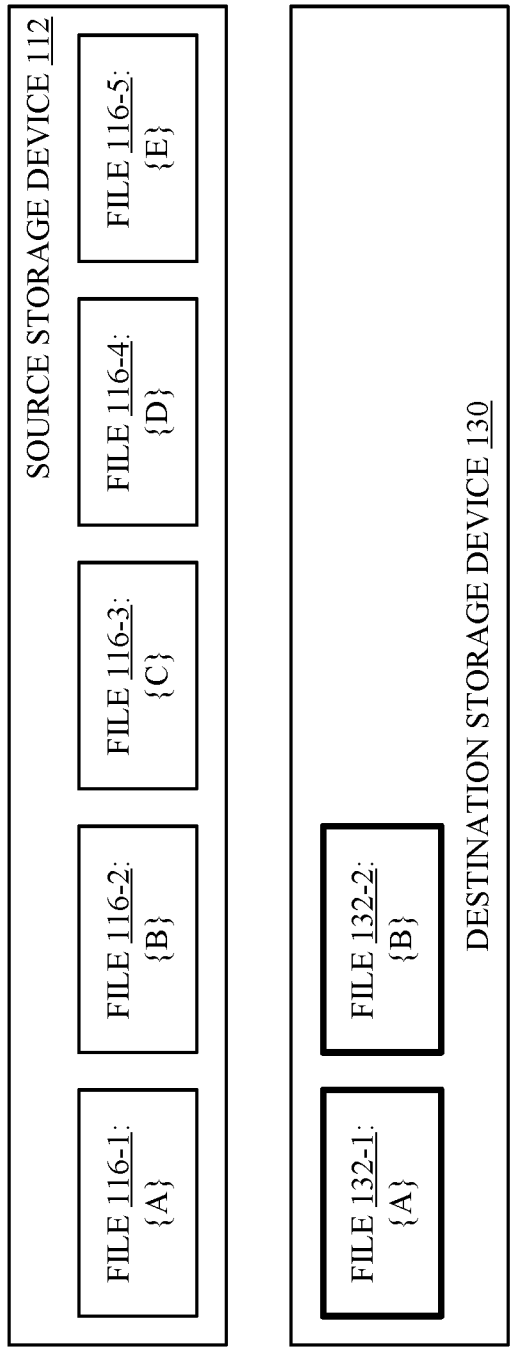

Next, at step 230 in FIG. 2C, the file system manager 110 receive a request to back up the source file 116 "B" from the source storage device 112 to the destination storage device 130. The file system manager 110 may recursively scan or search the destination storage device 130 to determine whether a file on the destination storage device 130 (e.g., destination nodes) corresponds to the source file 116 "B". In the example scenario, the destination storage device 130 includes a file corresponding to the source file 116 "B" (e.g., from a previous backup that included backing up a version of the source file 116 "B" by creating the destination file 132 "B" on the destination storage device 130). In response to determining that the destination storage device 130 includes the file 132 "B" corresponding to the file 116 "B", the file system manager 110 may determine whether the file 132 "B" is the same as the file 116 "B" using metadata corresponding to the file 132 "B" and the file 116 "B". If the file system manager 110 determines that the file 132 "B" is not the same as the file 116 "B" (e.g., based on a modification date of the file 116 "B" postdating a completion date of the file 132 "B", for example), the file system manager 110 may initiate a copy operation to copy the file 116 "B" to the destination storage device 130 (e.g., to a location on the destination storage device 130 corresponding to the new backup).

Alternatively, if the file system manager 110 determines that the file 132 "B" is the same as the file 116 "B", the file system manager 110 may initiate a propagation operation to propagate the file 132 "B" to the location on the destination storage device 130 corresponding to the new backup. For example, the file system manager 110 may move the file 132 "B" to the location of the new backup on the destination storage device 130. Additionally, or alternatively, the file system manager 110 may generate a hard link corresponding to the file 132 "B" and may store the hard link in the location corresponding the new backup on the destination storage device 130. The file system manager 110 my update the one or more completion metrics in response to propagating the source file 116 "B" to the destination storage device 130. For example, the file system manager 110 may update the one or more completion metrics based on metadata 122 associated with the source file 116 "B", as is described in greater detail herein.

Figure 2D:
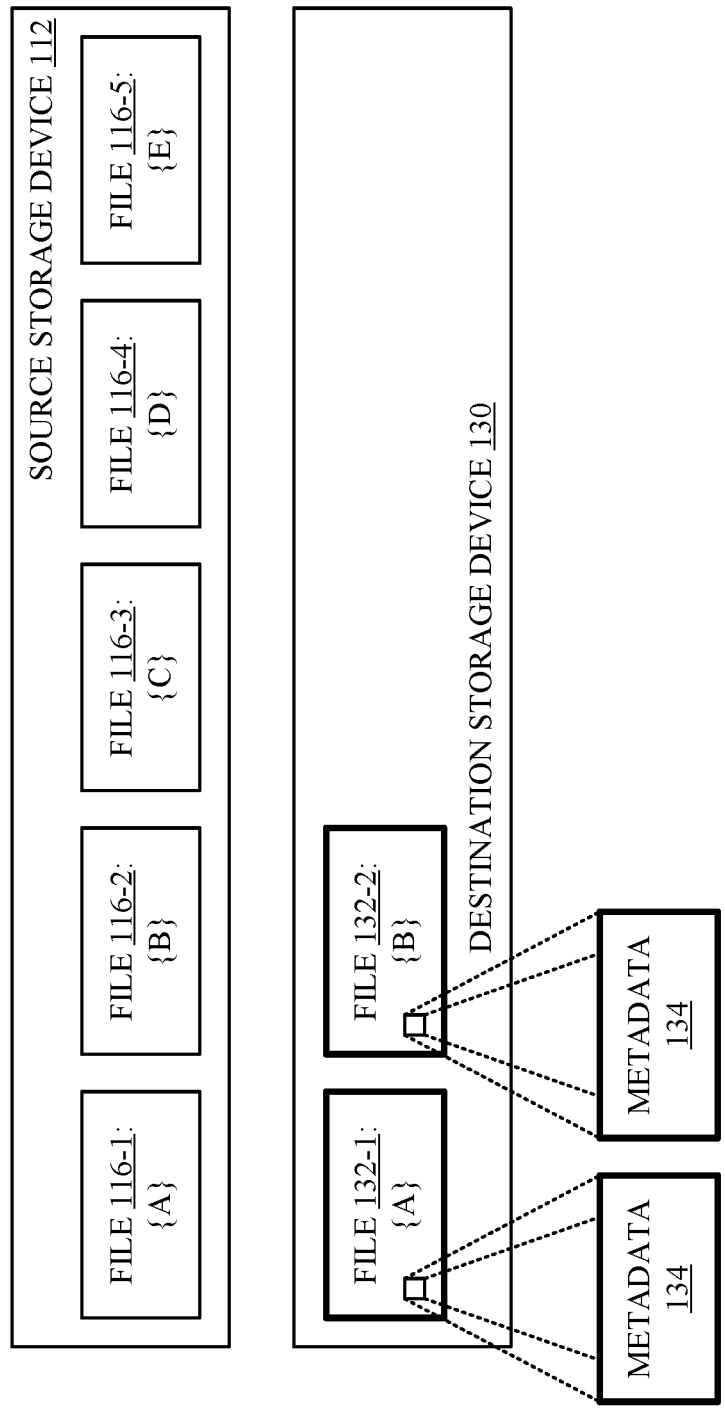

As is shown in FIG. 2D, a fourth step 240 can involve the file system manager 110 populating the metadata 134 of one or more of the destination files 132 "A" and "B" to indicate at least a completion date (e.g., for the successful backup) for the destination files 132 "A" and "B". For example, the file system manager 110 can include, within the metadata 134 that corresponds to the destination file 132 "A", sizing information of the destination file 132 "A", a completion date (e.g., for the successful backup) for the destination file 132 "A", and the like. The file system manager 110 can include, within the metadata 134 that corresponds to the destination file 132 "B", sizing information of the destination file 132 "B", a completion date (e.g., for the successful backup) for the destination file 132 "B", and the like. In this manner, the file system manager 110 can utilize the metadata 134 during a subsequent backup operation to identify destination nodes that correspond to source nodes (e.g., source files 116). Moreover, the file system manager 110 can utilize the metadata 134 during performance of a restoration procedure, which is described below in conjunction with FIGS. 2F-2G.

Returning now to FIG. 2E, step 250 can include determining whether to copy or propagate each of source files 116 "C", "D", and "E" from the source storage device 112 to the destination storage device 130. For example, the file system manger 110 determines, for each source file 116 "C", "D", and "E", whether a destination file on the destination storage device 130 corresponds to respective source files 116 "C", "D", and "E". The file system manager 110 performs propagation operations for destination files corresponding to respective ones of the source files 116 "C", "D", and "E". Alternatively, for respective ones of the source files 116 "C", "D", and "E" not having a corresponding destination file on the destination storage device 130, the file system manager 110 can perform copy operations to establish destination files 132 corresponding to the respective ones of the source files 116 "C", "D", and "E".

The file system manager 110 can store, within metadata 134 of the destination files 132, various information about the relationships between the source files 116/corresponding destination files 132. For example, as shown in FIG. 2E, the file system manager 110 can be configured gather, for each of the source files 116 "C", "D", and "E" (i) block map information associated with the source file 116, and (ii) timestamp information associated with the source file 116. The block map information for a source file 116 can include various information about the source file 116, extents 124 of the source file 116 (e.g., a logical offset 126, a physical block offset 128, a number of physical blocks 129 etc.), and so on. Additionally, the timestamp information for a source file 116 can include any temporal information associated with the source file 116 (e.g., a creation date, a last-accessed date, a last-modified date, and so on). This timestamp information can be utilized by the file system manager 110 to identify, during subsequent backup procedures, destination files 132 corresponding to source files 116, as described. It noted that the foregoing listings are merely exemplary, and that any information associated with the source files 116 can be utilized to implement/supplement the techniques described herein. In this manner, the file system manager 110 can utilize this information when the destination files 132 "C", "D", and "E" are restored to the source storage device 112 at a subsequent time (e.g., during the restoration procedure described below in conjunction with FIGS. 2F-2G).

Figure 2F:
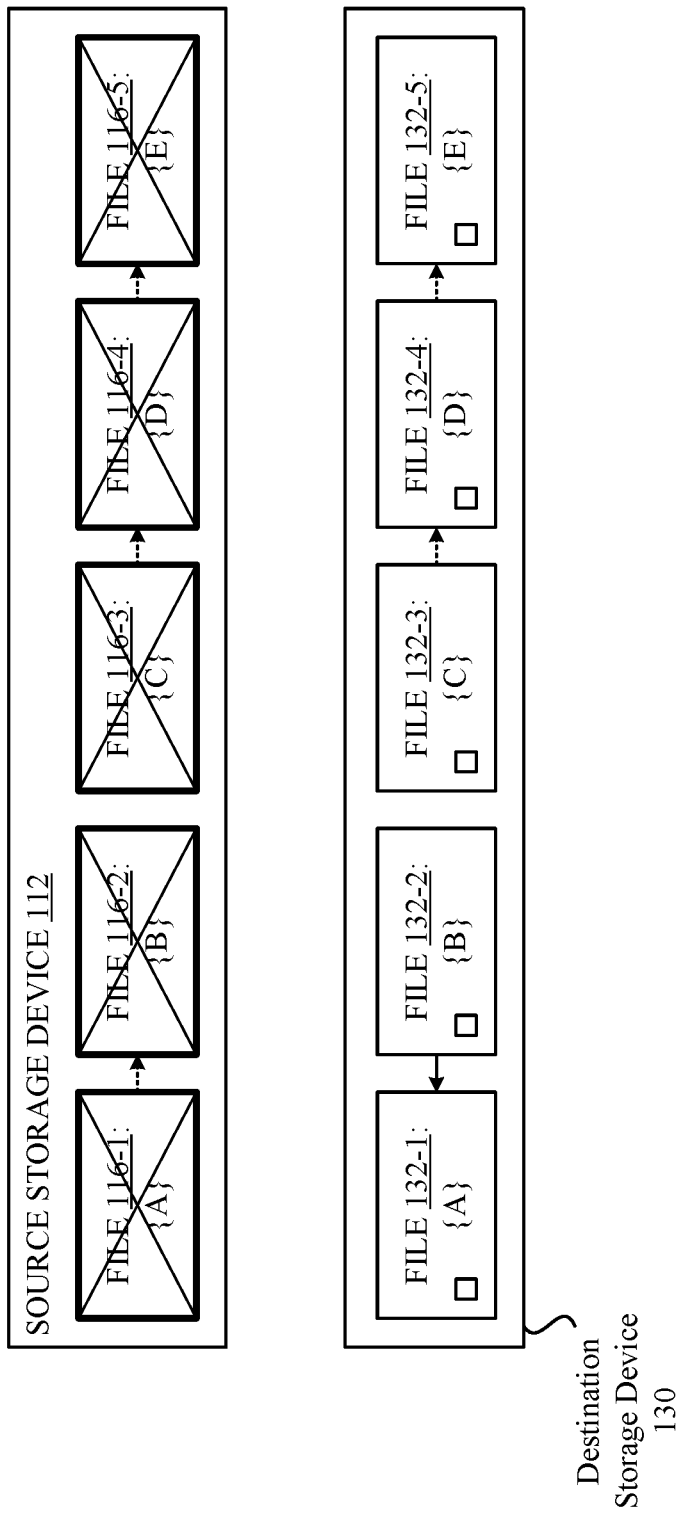

As shown in FIG. 2F, a step 260 can involve the file system manager 110 identifying a condition in which the source files 116 "A", "B", "C", "D", and "E" are no longer accessible within the source storage device 112. This can occur, for example, when the source storage device 112 becomes corrupted, when the computing device 102 (in which the source storage device 112 is included) is lost, and so on. In any case, the file system manager 110 can initialize a restoration procedure to restore the destination files 132 "A", "B", "C", "D", and "E" from the destination storage device 130 to the source storage device 112.

Figure 2G:
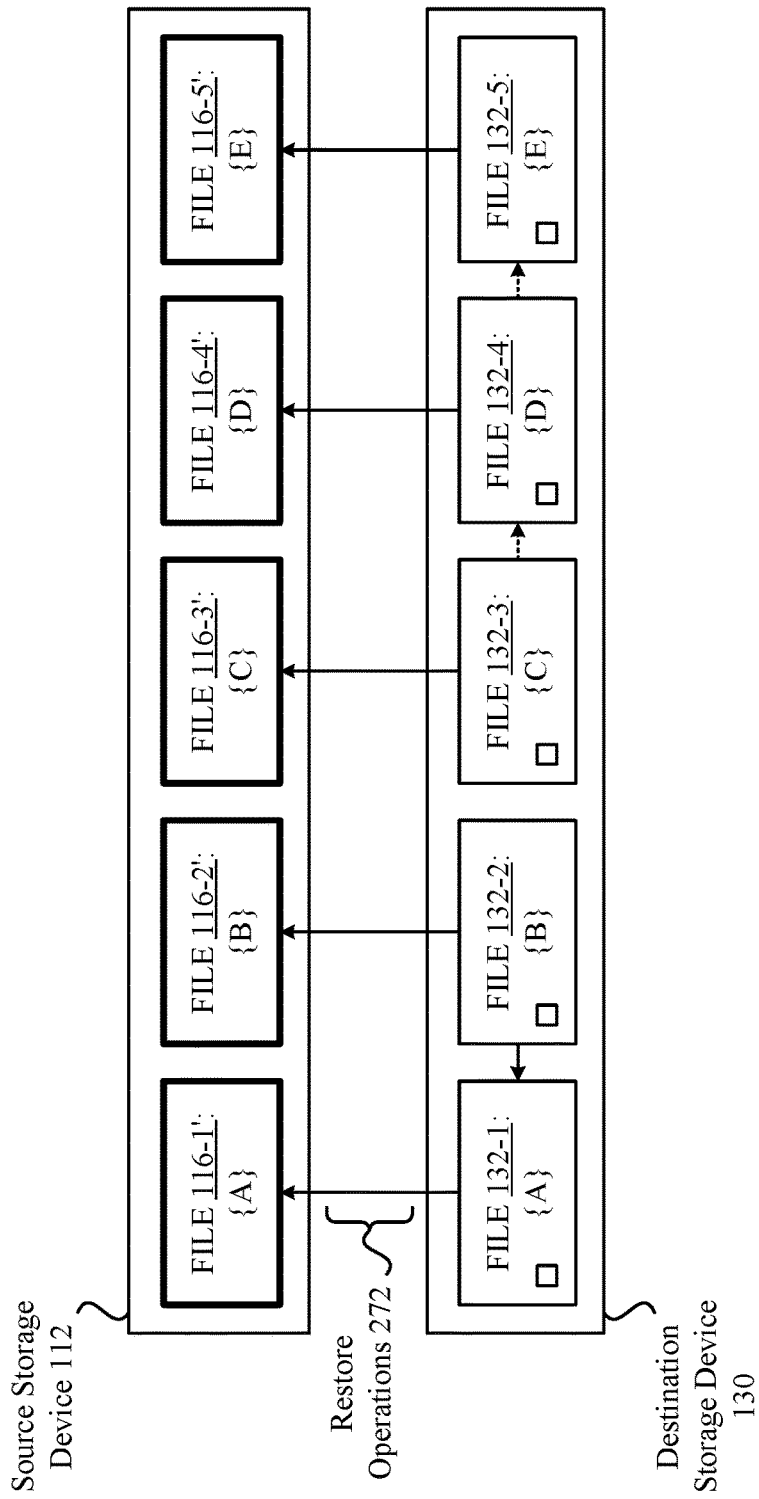

At step 270 of FIG. 2G, the file system manager 110 can first restore the destination files 132 "A" and "B" via restore operations 272. According to some embodiments, restoring the destination files 132 "A" and "B" can involve the file system manager 110 creating, within the source storage device 112, a restored source file 116 "A" that corresponds to the destination file 132 "A" and a restored source file 116 "B" that corresponds to the destination file 132 "B". For example, the file system manager 110 can copy the underlying data of the destination file 132 "A" to the source storage device 112 to establish the restored source file 116 "A". Additionally, the file system manager 110 can copy the underlying data of the destination file 132 "B to the source storage device 112 to establish the restored source file 116 "B".

Additionally, at step 270 of FIG. 2G, the file system manager 110 can restore the destination files 132 "C", "D", and "E" via the restore operations 272. According to some embodiments, restoring the destination files 132 "C", "D", and "E" can involve the file system manager 110 creating, within the source storage device 112, a restored source file 116 "C" that corresponds to the destination file 132 "C". For example, the file system manager 110 can identify information based on the metadata 134 (e.g., timestamps, block maps, etc.) associated with one or more of the destination files 132 "C", "D", and "E", and copy all of the extents 124 of the destination files 132 "C", "D", and "E" to the source storage device from 112 to the destination storage device 130 to establish the restored source files 116 "C", "D", and "E". Accordingly, at the conclusion of FIG. 2G, the restored source files 116 "A", "B", "C", "D", and "E" are stored within the source storage device 112.

Figure 2H:
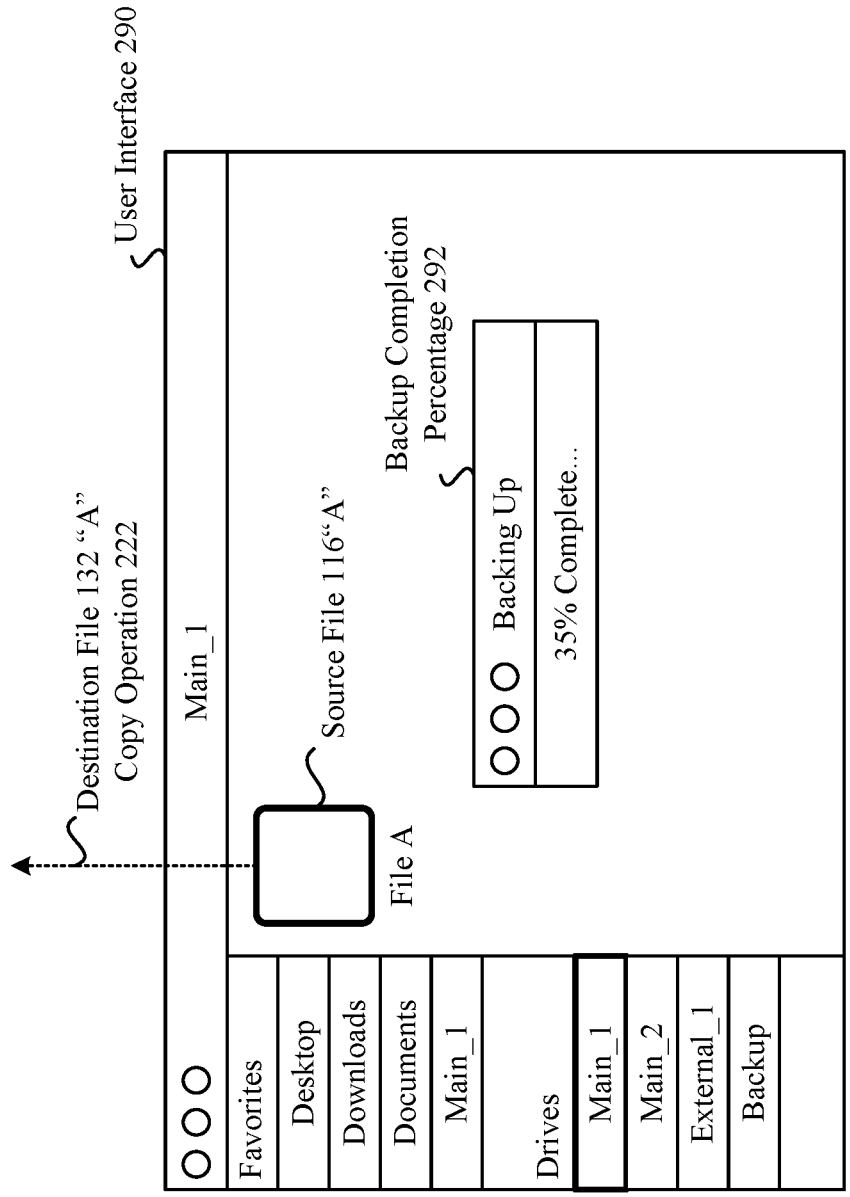

As described herein, the file system manager 110 can provide an improved backup progress estimate for a backup of a source storage device to a destination storage device. As is shown in FIG. 2H, source storage device, illustrated as Main_1 on a user interface 290, includes a source file 116 "A". At step 280 in FIG. 2H, the file system manager 110 performs the copy operation 222 to copy the source file 116 "A" from "Main_1" to the destination storage device "Main_2". According to some embodiments, to achieve this result, the file system manager 110 can, via copy operation 222, copy data of the source file 116 "A" from the source storage device 112 "Main_1" to the destination storage device 130 "Main_2" to establish a destination file 132 "A"

at the destination storage device 130 "Main_2". In this regard, the destination file 132 "A" consumes the same amount of storage space within the destination storage device 130 "Main_2" as the source file 116 "A" within the source storage device 112 "Main_1". Additionally, the user interface 290 may be configured to provide the user of the computing device 102 with access to various files, directories, applications, and the like on the computing device 102. The user interface 290 may include any suitable user interface having any suitable features.

In some embodiments, the user interface 290 may be configured to provide, to the user, the backup completion percentage 292, as described. The backup completion percentage 292 may be derived from one or more completion metrics, as described. The file system manager 110 may update the one or more completion metrics in conjunction with copying the source file 116 "A" to "Main_2". For example, file system manager 110 may identify metadata associated with the source file 116 "A". The metadata may include a file size of the source file 116 "A" and/or other suitable information.

The file system manager 110 may update the total number of files complete metric, the total number of bytes complete metric, the total number of source nodes of a predetermined source nodes list complete metric, and/or any other suitable metric. For example, the file system manager 110 may update the total number of files complete metric by incrementing the total number of files complete metric by one (e.g., indicating that a file was copied from "Main_1" to "Main_2"). Additionally, or alternatively, the file system manager 110 may update the total number of bytes complete metric by adding the number of bytes of the source file 116 "A" corresponding to the file size of the source file 116 "A" indicated by the metadata. The file system manager 110 may determine whether the source nodes list includes the source file 116 "A". If the source nodes list includes the source file 116 "A", the file system manager 110 may update the total number of source nodes of a predetermined source nodes list complete metric by incrementing the total number of source nodes of a predetermined source nodes list complete metric by one (e.g., indicating that a file on the source node s list was copied from "Main_1" to "Main_2"). The file system manager 110 may update the backup completion percentage 292 based on the one or more completion metrics.

Accordingly, FIGS. 2A-2H provide a detailed breakdown of an example scenario in which the file system manager 110 performs backup and restore operations between a source storage device (e.g., the source storage device 112) and a destination storage device (e.g., the destination storage device 130), while providing an improved incremental backup progress indication.

Referring now to FIG. 3, method 300 for providing an improved backup progress estimate for a backup of a source FSV of the computing device 102, is generally illustrated. According to some embodiments, the method 300 can be implemented by the computing device 102, and/or by any other software and/or hardware accessible to the computing device 102. At 310, the computing device 102 determines, for the source FSV, a total backup size indicator based on at least a total number of files and a total number of bytes of data of the source FSV.

At 320, the computing device 102, in response to determining that a destination FSV includes a destination node corresponding to the source node, propagates the destination node. The destination FSV may be stored on a destination storage device (e.g., such as the destination storage device 130) that corresponds to the source FSV. The computing device 102 may propagate the destination node by moving the destination node to a location corresponding to the backup of the source FSV on the destination storage device 130 and/or associating a hard link corresponding to the destination FSV with the backup of the source FSV on the destination storage device 130. The computing device may update, in response to a determination that the metadata 134 of the destination node indicates that the destination node and the source node are the same, at least one completion metric.

At 330, the computing device 102, in response to determining that the destination FSV does not include a destination node corresponding to the source node, copies the source node to the location corresponding to the backup of the source FSV on the destination storage device 130. The computing device 102 may update the metadata 134 associated with the source node (e.g., the copy of the source node stored on the destination storage device 130). The computing device 102 may update the at least one completion metric.

At 340, the computing device 102 may provide a backup completion percentage that is based on the at least one completion metric.

Figure 4:
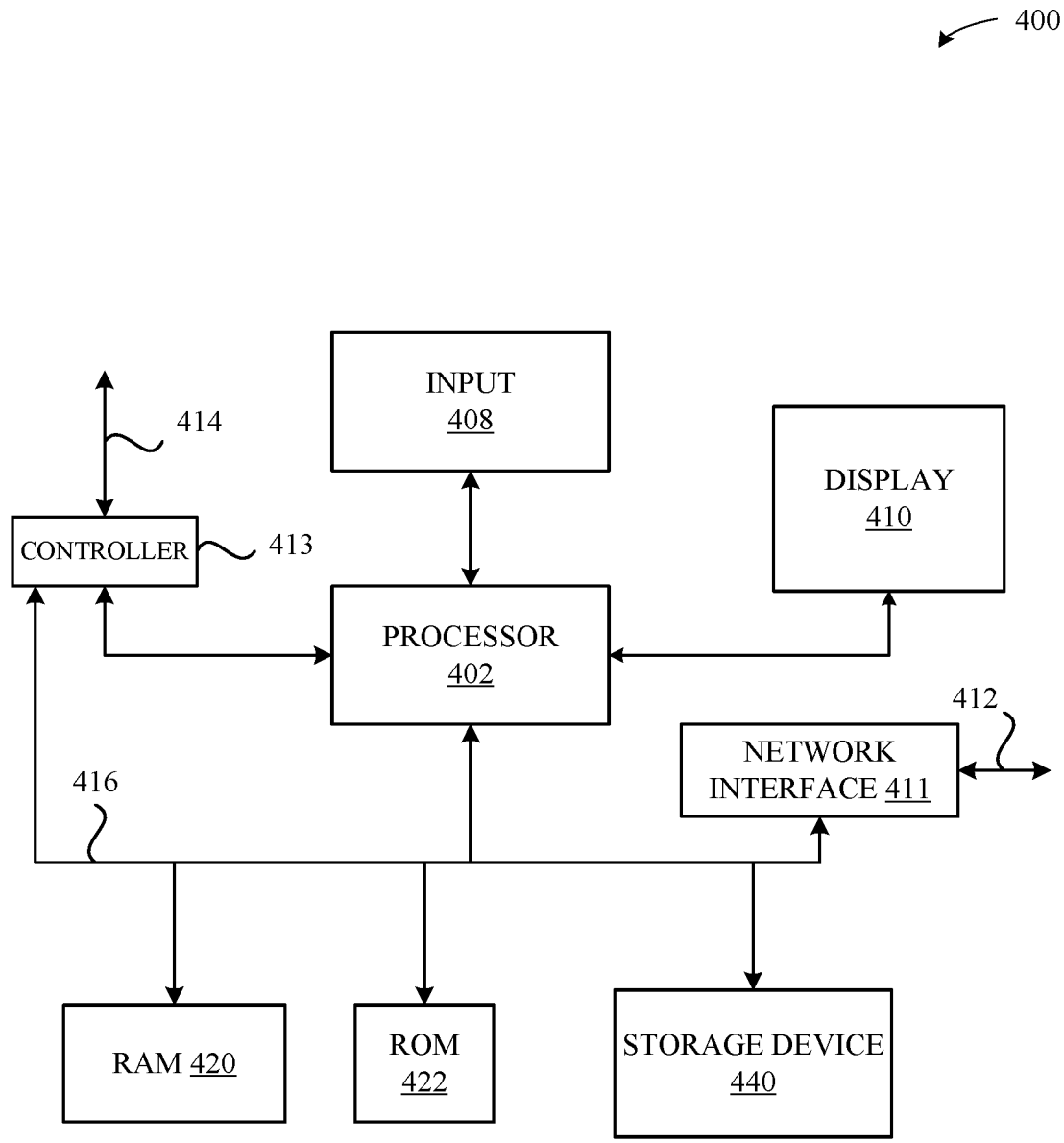
FIG. 4 illustrates a detailed view of components that can be included in the computing device illustrated in FIG. 1, according to some embodiments.

FIG. 4 illustrates a detailed view of a computing device 400 that can be used to implement the various techniques described herein, according to some embodiments. In particular, the detailed view illustrates various components that can be included in the computing device 102 described in conjunction with FIG. 1. As shown in FIG. 4, the computing device 400 can include a processor 402 that represents a microprocessor or controller for controlling the overall operation of the computing device 400. The computing device 400 can also include a user input device 408 that allows a user of the computing device 400 to interact with the computing device 400. For example, the user input device 408 can take a variety of forms, such as a button, keypad, dial, touch screen, audio input interface, visual/image capture input interface, input in the form of sensor data, and so on. Still further, the computing device 400 can include a display 410 that can be controlled by the processor 402 (e.g., via a graphics component) to display information to the user. A data bus 416 can facilitate data transfer between at least a storage device 440, the processor 402, and a controller 413. The controller 413 can be used to interface with and control different equipment through an equipment control bus 414. The computing device 400 can also include a network/bus interface 411 that couples to a data link 412. In the case of a wireless connection, the network/bus interface 411 can include a wireless transceiver.

As noted above, the computing device 400 also includes the storage device 440, which can comprise a single disk or a collection of disks (e.g., hard drives). In some embodiments, storage device 440 can include flash memory, semiconductor (solid state) memory or the like. The computing device 400 can also include a Random-Access Memory (RAM) 420 and a Read-Only Memory (ROM) 422. The ROM 422 can store programs, utilities or processes to be executed in a non-volatile manner. The RAM 420 can provide volatile data storage, and stores instructions related to the operation of applications executing on the computing device 400, e.g., the file system manager 110.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, hard disk drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for providing a backup progress estimate for a backup of a source file system volume (FSV) associated with a source computing device, the method comprising, at the source computing device:
   establishing at least one completion metric;
   interfacing with a destination storage device that stores a destination FSV;
   for each source node of a first plurality of source nodes for which there is a corresponding destination node stored within the destination FSV:
      causing the destination node to be added to a location within the destination storage device that corresponds to the backup of the source FSV, and
      updating the at least one completion metric;
   for each source node of a second plurality of source nodes for which there is no corresponding destination node stored within the destination FSV:
      copying the source node to the location, and
      updating the at least one completion metric; and
   updating the backup progress estimate in conjunction with updates to the at least one completion metric.

2. The method of claim 1, wherein:
   causing the destination node to be added to the location comprises at least one of (i) moving the destination node to the location, or (ii) establishing, within the location, a new node that is hard linked to the destination node, and
   the at least one completion metric includes at least a total number of files associated with added destination nodes and/or copied source nodes divided by a total number of files corresponding to the backup.

3. The method of claim 2, wherein the at least one completion metric includes at least a total number of bytes associated with added destination nodes and/or copied source nodes divided by a total number of bytes corresponding to the backup.

4. The method of claim 1, further comprising:
   identifying a predetermined number of source nodes of the first and second plurality of source nodes according to a respective size of each source node; and
   generating a source nodes list comprising the predetermined number of source nodes.

5. The method of claim 4, wherein the at least one completion metric includes at least a total number of completed source nodes of the source nodes list divided by a total number of source nodes on the source nodes list.

6. The method of claim 1, further comprising:
excluding, from the first and second plurality of source nodes, source nodes having a node type indicating exclusion from the backup of the source FSV or a specific location indicating exclusion from the backup of the source FSV.

7. The method of claim 6, further comprising:
updating the backup progress estimate based on at least a number of files and a number of bytes associated with the source nodes excluded from the backup of the source FSV.

8. The method of claim 1, wherein:
determining a total backup size indicator for the source FSV includes identifying at least one snapshot of source FSV, and
a total number of files and a total number of bytes of the source FSV correspond to the at least one snapshot of the source FSV.

9. The method of claim 8, further comprising:
excluding, from the total number of files of the source FSV, files having a file type indicating exclusion from the at least one snapshot of the source FSV or a specific location indicating exclusion from the at least one snapshot of the source FSV.

10. The method of claim 9, further comprising:
updating the backup progress estimate based on the files excluded from the at least one snapshot of the source FSV and a number of bytes associated with the files excluded from the at least one snapshot of the source FSV.

11. At least one non-transitory computer readable storage medium configured to store instructions that, when executed by at least one processor included in a computing device, cause the computing device to provide a backup progress estimate for a backup of a source file system volume (FSV) associated with a source computing device, by carrying out steps that include:
establishing at least one completion metric;
interfacing with a destination storage device that stores a destination FSV;
for each source node of a first plurality of source nodes for which there is a corresponding destination node stored within the destination FSV:
causing the destination node to be added to a location within the destination storage device that corresponds to the backup of the source FSV, and
updating the at least one completion metric;
for each source node of a second plurality of source nodes for which there is no corresponding destination node stored within the destination FSV:
copying the source node to the location, and
updating the at least one completion metric; and
updating the backup progress estimate in conjunction with updates to the at least one completion metric.

12. The at least one non-transitory computer readable storage medium of claim 11, wherein:
causing the destination node to be added to the location comprises at least one of (i) moving the destination node to the location, or (ii) establishing, within the location, a new node that is hard linked to the destination node, and
the at least one completion metric includes at least a total number of files associated with added destination nodes and/or copied source nodes divided by a total number of files corresponding to the backup.

13. The at least one non-transitory computer readable storage medium of claim 12, wherein the at least one completion metric includes at least a total number of bytes associated with added destination nodes and/or copied source nodes divided by a total number of bytes corresponding to the backup.

14. The at least one non-transitory computer readable storage medium of claim 11, wherein the steps further include:
identifying a predetermined number of source nodes of the first and second plurality of source nodes according to a respective size of each source node; and
generating a source nodes list comprising the predetermined number of source nodes.

15. The at least one non-transitory computer readable storage medium of claim 14, wherein the at least one completion metric includes at least a total number of completed source nodes of the source nodes list divided by a total number of source nodes on the source nodes list.

16. The at least one non-transitory computer readable storage medium of claim 11, wherein the steps further include:
excluding, from the first and second plurality of source nodes, source nodes having a node type indicating exclusion from the backup of the source FSV or a specific location indicating exclusion from the backup of the source FSV.

17. The at least one non-transitory computer readable storage medium of claim 16, wherein the steps further include:
updating the backup progress estimate based on at least a number of files and a number of bytes associated with the source nodes excluded from the backup of the source FSV.

18. The at least one non-transitory computer readable storage medium of claim 11, wherein:
determining a total backup size indicator for the source FSV includes identifying at least one snapshot of source FSV, and
a total number of files and a total number of bytes of the source FSV correspond to the at least one snapshot of the source FSV.

19. The at least one non-transitory computer readable storage medium of claim 18, wherein the steps further include:
excluding, from the total number of files of the source FSV, files having a file type indicating exclusion from the at least one snapshot of the source FSV or a specific location indicating exclusion from the at least one snapshot of the source FSV; and
updating the backup progress estimate based on the files excluded from the at least one snapshot of the source FSV and a number of bytes associated with the files excluded from the at least one snapshot of the source FSV.

20. A computing device configured to provide a backup progress estimate for a backup of a source file system volume (FSV), the computing device comprising at least one processor configured to cause the computing device to carry out steps that include:
establishing at least one completion metric;
interfacing with a destination storage device that stores a destination FSV;
for each source node of a first plurality of source nodes for which there is a corresponding destination node stored within the destination FSV:

causing the destination node to be added to a location within the destination storage device that corresponds to the backup of the source FSV, and
updating the at least one completion metric;
for each source node of a second plurality of source nodes for which there is no corresponding destination node stored within the destination FSV:
copying the source node to the location, and
updating the at least one completion metric; and
updating the backup progress estimate in conjunction with updates to the at least one completion metric.

* * * * *